United States Patent

Kobayashi et al.

[15] 3,691,313

[45] Sept. 12, 1972

[54] SIGNAL RESPONSIVE CONTROL CIRCUIT FOR MAGNETIC RECORDING AND REPRODUCING APPARATUS

[72] Inventors: Hiroshi Kobayashi; Sukeyori Shiba, both of Tokyo, Japan

[73] Assignee: Kabushikikaisha Nippon Recruit Center, Tokyo, Japan

[22] Filed: June 4, 1970

[21] Appl. No.: 43,364

[30] Foreign Application Priority Data

June 14, 1969 Japan ......................44/47128
June 14, 1969 Japan ......................44/47129

[52] U.S. Cl. ...................179/100.2 S, 179/100.1 VC
[51] Int. Cl. ............................................G11b 15/22
[58] Field of Search.......179/1 VC, 100.1 VC, 100.2 MD,
179/100.2 S

[56] References Cited

UNITED STATES PATENTS 3,280,271 10/1966 Meyer.............179/100.2 MD

FOREIGN PATENTS OR APPLICATIONS 249,961 3/1963 Australia..........179/100.1 VC

OTHER PUBLICATIONS

Lafayette Catalog No. 660, Copyrighted 1965, Lafayette Radio Electronics Corp., Syosset, L.I., N.Y., pages 113- 119.

*Primary Examiner*—J. Russell Goudeau
*Attorney*—Hill, Sherman, Meroni, Gross and Simpson

[57] ABSTRACT

A magnetic recording and reproducing apparatus comprising a magnetic tape, means for driving said magnetic tape, and means for automatically stopping the operation said magnetic tape driving means upon arrival of a signal on which a learner or an operator is required to think or perform some function.

2 Claims, 1 Drawing Figure

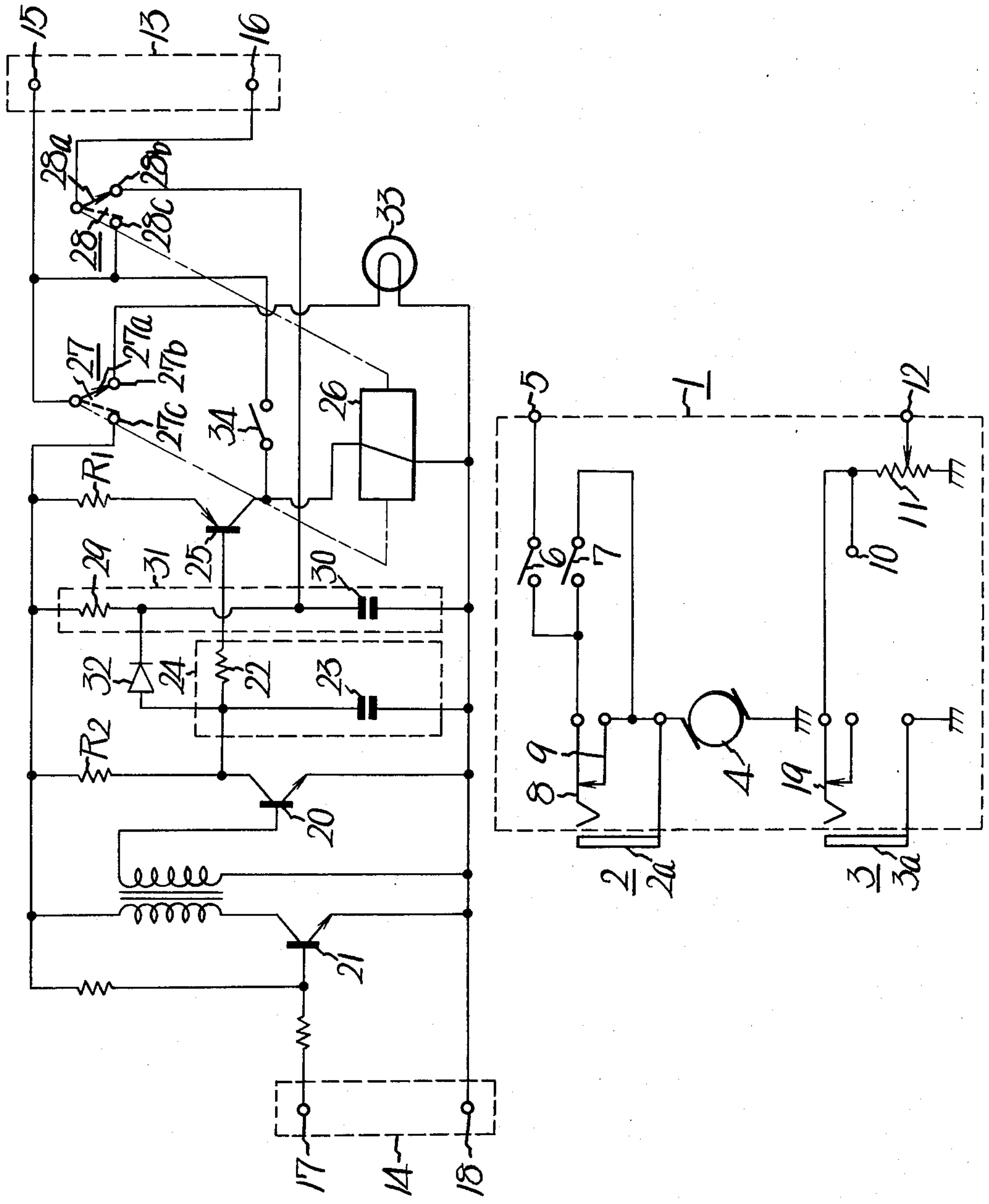
INVENTORS
Hiroshi Kobayashi
Sukeyori Shiba
BY Hill, Sherman, Meroni, Gross & Simpson ATTORNEYS

SIGNAL RESPONSIVE CONTROL CIRCUIT FOR MAGNETIC RECORDING AND REPRODUCING APPARATUS

BACKGROUND OF THE INVENTION

1. Field of the Invention

This invention relates to a magnetic recording and reproducing apparatus and more particularly to a magnetic recording and reproducing apparatus for individual teaching aid in which a learner or an operator studies instructional material by reproducing the instructional material recorded on a magnetic medium such, for example, as a magnetic tape.

2. Description of the Prior Art

In prior art magnetic recording and reproducing apparatus, the student must usually control the stopping of the tape after a particular lesson has been reproduced from the tape so that he can concentrate on the lesson or make notes. The necessity of interrupting the lesson to go through the physical acts of stopping and starting the tape necessarily decreases the amount of concentration which the student applies to the lesson.

SUMMARY OF THE INVENTION

It is one object of the present invention to provide a magnetic recording and reproducing apparatus which can automatically stop its reproducing operation when a learner or an operator is required to think, exercise or ascertain reproduced instruction contents and which is operated again with simple means after thinking, exercise or ascertaining is completed.

It is another object of the present invention to provide a magnetic recording and reproducing apparatus which can operate at different speeds for learners or operators of different abilities in order that they can study or exercise the reproduced instructions adequately.

BRIEF DESCRIPTION OF THE DRAWING

The attached FIGURE is a schematic connection diagram for illustrating one example of the magnetic recording and reproducing apparatus according to the present invention.

DESCRIPTION OF THE PREFERRED EMBODIMENT

One example of the present invention will be hereinafter described in connection with the attached drawing. In the FIGURE reference numeral 1 designates a magnetic recording and reproducing apparatus which has been provided with a jack 2 for remote control and a jack 3 for monitor. A motor 4 for driving, for example a capstan (not shown) of the magnetic recording and reproducing apparatus 1 is connected to a circuit including the jack 2. Reference numeral 5 represents an electric power source terminal for supplying electric power to the motor 4 and a circuit which will be explained later in detail. The terminal 5 is connected to a movable contact piece 8 of the jack 2 through a switch 6 and also to a contact piece 9 of a change-over switch through the switches 6 and 7. The switch 6 is closed when the magnetic recording and reproducing apparatus 1 is used for recording, reproducing, fast forwarding and fast rewinding operations and the switch 7 is closed in the case of fast forwarding and fast rewinding operations. Reference numeral 10 represents a terminal to which a signal reproduced from a magnetic tape (not shown) is applied. The signal supplied to the terminal 10 is delivered to a terminal 12 through a variable resistor 11 and also to a contact piece 19 of the monitor jack 3. The signal obtained at the terminal 12 is supplied to a speaker (not shown) through, for example, an amplifier (also not shown).

In the case where the remote control jack 2 having the movable contact piece 8 and a contact piece **2*a* connected to the earth and the monitor jack 3 having the movable contact piece 19 and a contact piece 3*a* connected to the earth are provided on the magnetic recording and reproducing apparatus 1, plugs 13 and 14 are respectively provided, the plug 13, for example, being inserted into the remote control jack 2 and the plug 14 being inserted into the monitor jack 3 respectively. When the plug 13 is inserted into the jack 2, contact of the movable contact piece 8 with the contact piece 9 is released to electrically contact the contact piece 8 with one contact (or terminal), for example, 15 of the plug 13 and to electrically contact the contact piece 2*a* of the jack 2 with another contact (or terminal) 16 of the plug 13. As a result of this, the electric power source terminal 5 is connected to the terminal 15 (assuming that the switch 6 is closed) and the terminal 16 is connected to the motor 4. Further, when the plug 14 is inserted into the monitor jack 3, contacts (or terminals) 17 and 18 of the plug 14 are electrically connected to the movable contact piece 19 and the contact piece 3*a* of the monitor jack 3 respectively, the contact 3*a*** being grounded.

A monitor signal applied from the monitor jack 3 across both the terminals 17 and 18 of the plug 14 is supplied to a base of a first transistor 20. In the example, an amplifier transistor 21 and a coupling transformer T are employed ahead of the first transistors 20 and the monitor signal is applied through the transistor 21 and the coupling transformer T to the base of the first transistor 20. However, the transistor 21 and transformer T can be dispensed with, if desired and the monitor signal is directly applied to the transistor 20. When the signal is applied to the transistor 20, it becomes conductive, while when no signal is supplied to the transistor 20 it is kept non-conductive. The output side of the transistor 20 is connected to a second transistor 25 through a first time constant circuit 24 consisting of a resistor 22 and a capacitor 23. The first time constant circuit 24 is connected in series to the base-collector circuit of the second transistor 25. In practice, the collector of the first transistor 20 is connected to the connection point between the resistor 22 and the capacitor 23 of the first time constant circuit 24 and the free end of the resistor 22 is connected to the base of the second transistor 25. Reference numerals 27 and 28 respectively represent change-over switches which are respectively operated by a relay 26 inserted into the emitter-collector circuit of the transistor 25. The change-over switches 27 and 28 are respectively composed of movable contact pieces **27*a*, 28*a* and two stationary (fixed) contacts 27*b*, 27*c*, and 28*b*, 28*c*. The movable contact piece 27*a* of the change-over switch 27 is connected to the terminal 15** of the plug 13, one fixed contact 27*b* connected to the terminal 18 of the plug 14 through a lamp 33 and the other fixed contact 27*c* connected to the connection point of resistors R1 and R2, that is, to the emitter of the second transistor 25 through the resistor R1 and to the collector of the first transistor 20 through the resistor R2. On the other hand, the movable contact piece 28*a* of the other change-over switch 28 is connected to the terminal 16 of the plug 13, the fixed contact 28*b* to the connection point between a resistor 29 and a capacitor 30 which compose a second time constant circuit 31 explained later and the other fixed contact 28*c* to the terminal 15 of the plug 13 and also to the connection opoint between the collector of the second transistor 25 and the relay 26 through a start switch 34, the connection point between the relay 26 and the lamp 33 being connected to the terminal 18 of the plug 14. An explanation will be hereinbelow described in connection with the relationship between the relay 26 and the change-over switches 27 and 28. When the relay 26 is not energized, its movable contact pieces 27*a* and 28*a* are contacted with the fixed contacts 27*b* and 28*b* respectively as shown in the figure by the solid lines, while when the relay 26 is energized its movable contact pieces 27*a* and 28*a* are changed over to contact with the other fixed contacts 27*c* and 28*c* respectively as shown in the figure by the dotted lines.

The above mentioned second time constant circuit 31 will now be explained in detail. The second time constant circuit 31 is inserted into the electric power source circuit for the transistors 20, 21, and 25. The connection point between the resistor 22 and the capacitor 23 of the first time constant circuit 24 is connected through a diode 32 to the connection point between the resistor 29 and the capacitor 30 of the second time constant circuit 31. In this example the anode of the diode 32 is connected to the connection point between the resistor 22 and the capacitor 23 of the first time constant circuit 24 and the cathode of the diode 32 to the connection point between the resistor 29 and the capacitor 30 of the second time constant circuit 31. In this case, assume that the resistance values of the resistors 22 and 29 are referred to R22 and R29, the capacity values of the capacitors 23 and 30 are referred to C23 and C30 and that the relationships between the values are respectively selected to be $R22<R29$ and $C23<C30$.

According to the present invention constructed as set forth above, when the switch 6 is closed; namely turned "on"; the plugs 13 and 14 are respectively inserted into the jacks 2 and 3; the magnetic recording and reproducing apparatus 1 is prepared for reproducing operation and the start switch 34 5- the closed, the circuit of the electric power source terminal 5-the switch 6- the movable contact piece 8- the terminal 15- the start switch 34- the relay 26- the terminal 18- the contact piece 3*a*- the earth is closed to energize the relay 26. As a result, the movable contact piece 28a is changed over to the fixed contact 28*c* to short circuit the terminals 15 and 16 of the plug 13 to close the circuit of the 5- the switch 6- the movable contact piece 8- the terminal 15- the fixed contact 28*c*- the movable contact piece 28*a*-the terminal 16- the contact piece 2*a*- the motor 4- the earth, whereby the motor 4 is driven to drive the magnetic tape. When the relay 26 is energized the movable contact piece 27*a* is also changed over to contact with the fixed contact 27*c* so that the respective circuits set forth above are supplied with the electric power from the electric power source terminal 5. Accordingly, the capacitors 23 and 30 of the first and second time constant circuits 24 and 31 start to store electric charge thereon. In this case the second transistor 25 is kept conductive until the capacitor 23 is charged because within this time interval the potential of the base of the second transistor 25 is lower than that of the emitter thereof. In such a case even if the start switch 34 is opened the circuit of 15–27*a*–27*c*–25–26–18 is closed due to the conduction of the second transistor 25 to hold the relay 26 in the energized condition, namely this circuit constitutes the self-holding circuit of the relay 26. In the present examples since the capacity values of the capacitors 23 and 30 and the resistance values of the resistors 22 and 29 are selected as set forth, the voltage across the capacitor 30 never exceeds that across the capacitor 23 to keep the diode 32 conductive, which, in turn, will mean that the first and second time constant circuits 24 and 31 are connected in parallel to the collector of the first transistor 20 to make a time constant circuit having a large time constant. As a result, the time T1 from the time point when the start switch 34 is closed to the time point when the second transistor 25 is made non-conductive can be made greater.

If the reproduced signal is applied to the first transistor 20 from the monitor jack 3 through the plug 14 within the time T1 after closing of the start switch 34, the transistor 20 is made conductive to keep the "on"state of the second transistor 25, whereby the relay 26 is kept energized. Within this time interval the magnetic recording and reproducing apparatus carries out its reproducing operation. As the transistor 20 is made conductive, the anode potential of the diode 32 becomes substantially the earth potential while the cathode potential thereof is that of the capacitor 30, so that reverse bias is applied across the diode 32 to make it non-conductive. As a result, the second time constant circuit 31 is now disconnected from the first time constant circuit 24.

When the reproduced signal to the first transistor 20 is discontinued or terminated during the reproduction operation of the apparatus, the transistor 20 is made non-conductive to make the second transistor 25 non conductive after lapse of time of the time constant T2 of the first time constant circuit 24 only. As a result, the self-holding circuit of the relay 26 is opened to deenergize the relay 26 and to bring the movable contact pieces 27*a* and 28*a* to the fixed contacts 27*b* and 28*b* respectively as shown in the figure by the solid lines, whereby the motor 4 is stopped. In this case the charge stored on the capacitor 30 is discharged through the circuit of 30–28*b*–28*a*–16–2*a*– the earth instantaneously.

While according to the present invention the magnetic tape is continuously driven during the time when the reproduced signal corresponding to that of the mere instruction components is supplied to the first transistor 20, the reproduction operation of the present magnetic recording and reproducing apparatus is automatically stopped after the time, within which no signal is applied to the transistor 20, exceeds the predetermined time T2 because of the fact that on the magnetic tape reproduced by the present invention there is provided a portion which has recorded no signal of comparatively long time, said portion following to a portion having recorded thereon signals to which a learner is required to pay specific study or exercise. For this reason, according to the present invention a learner can think or study the reproduced contents of the last mentioned portion sufficiently.

If a learner wants to study the following content after thinking or studying the specific reproduced contents is finished, the repetition of the operation set forth above is carried out to drive the motor 4 and to reproduce the following contents by only closing the start switch 34 again.

By closing the switch 7 the motor 4 can be driven through the closed circuit of 5–6–7–4– the earth to carry out the fast forwarding and fast rewinding operation of the magnetic tape irrespective of the circuit conditions.

Since according to the present invention after the instruction contents are reproduced its reproducing operation can be stopped in the time which will be required by the learner to study or think the reproduced instruction contents, the learner can sufficiently study or think the contents in accordance with his ability.

Further, according to the present invention the first and second time constant circuits 24 and 30 are automatically connected in parallel with each other at the starting time of the apparatus, so that it is avoided that the transistor 25 is rendered nonconductive due to no signal of comparatively long time duration at the starting time of the apparatus, namely the apparatus is stopped due to no signal of long time duration after starting.

After the apparatus of the present invention is operated to reproduce the instruction contents recorded on the magnetic tape, it is controlled with the time constant T2 (T2<T1) of the first time constant circuit 24, so that the apparatus instantaneously starts its operation after the reproduced signal is terminated.

Since according to the present invention the control circuit including the transistors 20, 25, the time constant circuits 24, 31 and the like is provided between the plugs 13 and 14 which are respectively inserted into the jacks 2 and 3, the present invention can be formed to be the so-called adapter type one which can be easily applied for a conventional recording and reproducing apparatus.

The example of the present invention shown in the figure is the case where the present invention is formed as an adapter, that is, the control circuit is provided between the plugs 13 and 14 which are respectively inserted into the remote control jack 2 and the monitor jack 3 provided on the recording and reproducing apparatus. However, the device including the control circuit may be directly incorporated into the recording and reproducing apparatus itself, if desired.

In the foregoing example the magnetic tape is employed in the present invention which magnetic tape has recorded thereon no signal of comparatively long time duration after the content portion to which a learner is required to pay much time to study or think it. However, it is possible that a magnetic tape of two tracks is used on one track of which are recorded instructions, while a signal of a predetermined frequency, for example, 800 Hz is recorded on the other track of the magnetic tape at the position corresponding to the portion to which the learner is required to pay specific attention and that when the signal from the latter track is detected the driving of the magnetic tape is stopped.

The foregoing explanation is made in connection with the reproduction operation of the present invention. However, it will be apparent that the present invention can be used for recording, for example, instruction contents with no signal portion contiguous thereto of desired time length.

Although the foregoing description is made on the case where the present invention is employed for a learner to study or exercise, the present invention can be used for manual operation of apparatus, for example, a computer. In this case, such a tape is used as has recorded thereon instructions for indicating a manual operation to be treated or ascertained by an operator and no signal portion contiguous thereto corresponding to time interval within which the operator could acomplish his treating or ascertaining operation.

We claim as our invention:

1. A time delay circuit for controlling operation of a magnetic tape upon which signals have been recorded comprising 1. means for connecting said circuit to a source of electric potential and to a motor for driving said tape,
2. switch means in the portion of the circuit connected to the motor,
3. a first transistor in said circuit, 4. means for applying a signal from said tape to the base of said first transistor,
5. a second transistor connected to the output side of said first transistor,
6. a first resistor and a first capacitor forming part of a first time constant circuit, said first time constant circuit being connected to the output of said first transistor and being connected in series to the base-collector circuit of said second transistor,
7. a second resistor and a second capacitor connected in parallel with said first time constant circuit and forming part of a second time constant circuit, said second resistor and capacitor having greater resistance and capacity values, respectively, than said first resistance and first capacitor,
8. a diode connected between said first resistor and second capacitor with the anode connected to said first resistor and the cathode connected to said second capacitor,
9. a relay in the emitter-collector circuit of said second transistor,
10. second switch means in series with said relay for opening and closing the circuit through said relay,
11. a third switch means operated by said relay to automatically connect said motor, transistors and time constant circuits to said potential source when said relay is energized and to disconnect said motor when said relay is deenergized, said first transistor being conductive when signals are applied to it from said tape and being non-conductive when no signal is applied thereto, and said second transistor being non-conductive after a lapse of time equal to the time constant of said first time constant circuit.

2. The time delay circuit of claim 1 in which said third switch means automatically disconnects said electric potential source from said transistors and time constant circuits when said relay is deenergized.

* * * * *